United States Patent
Azenkot et al.

(10) Patent No.: US 9,537,908 B2
(45) Date of Patent: Jan. 3, 2017

(54) COLLABORATIVE MOBILE INTERACTION

(71) Applicant: Microsoft Technology Licensing, LLC, Redmond, WA (US)

(72) Inventors: Shiri Azenkot, Seattle, WA (US); Meredith June Morris, Bellevue, WA (US); Jaime Brooks Teevan, Bellevue, WA (US); Daniel John Liebling, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 13/915,382

(22) Filed: Jun. 11, 2013

(65) Prior Publication Data

US 2014/0365580 A1 Dec. 11, 2014

(51) Int. Cl.
*G06F 3/00* (2006.01)
*H04L 29/06* (2006.01)
*G06F 3/0346* (2013.01)

(52) U.S. Cl.
CPC .......... *H04L 65/403* (2013.01); *G06F 3/0346* (2013.01); *G06F 2200/1637* (2013.01)

(58) Field of Classification Search
CPC ................ H04L 65/403; G06F 3/0346; G06F 2200/1637
See application file for complete search history.

(56) References Cited

U.S. PATENT DOCUMENTS

| | | | |
|---|---|---|---|
| 6,466,250 B1 * | 10/2002 | Hein | H04N 7/144 348/14.08 |
| 8,244,721 B2 | 8/2012 | Morris et al. | |
| 8,266,139 B2 | 9/2012 | Morris et al. | |
| 2007/0124503 A1 | 5/2007 | Ramos et al. | |
| 2009/0204902 A1 * | 8/2009 | Morris | G06F 17/30 715/751 |
| 2010/0205190 A1 | 8/2010 | Morris et al. | |
| 2011/0270824 A1 | 11/2011 | Morris et al. | |
| 2012/0054355 A1 | 3/2012 | Arrasvuori et al. | |
| 2012/0284328 A1 * | 11/2012 | Chung | H04L 67/2833 709/203 |
| 2012/0290965 A1 * | 11/2012 | Ignor | G06F 3/0482 715/777 |
| 2013/0036112 A1 | 2/2013 | Poon | |
| 2013/0036165 A1 | 2/2013 | Tseng et al. | |

(Continued)

OTHER PUBLICATIONS

PCT Search Report dated Sep. 3, 2014 for PCT application No. PCT/US2014/040974, 12 pages.

(Continued)

*Primary Examiner* — Nicholas Augustine
*Assistant Examiner* — Parmanand Patel
(74) *Attorney, Agent, or Firm* — Alin Corie; Sandy Swain; Micky Minhas (57) ABSTRACT

Some examples include transitioning between an individual mode and a collaborative mode in response to an orientation change of a device. Further, some implementations include identifying data to be shared with one or more other devices (e.g., co-located devices) in the collaborative mode. In some examples, the individual mode may be associated with an individual search, the collaborative mode may be associated with a collaborative search, and the devices may transition between the individual mode and the collaborative mode in response to orientation changes.

20 Claims, 10 Drawing Sheets

(56) References Cited

U.S. PATENT DOCUMENTS

| | | |
|---|---|---|
| 2013/0041952 A1 | 2/2013 | Silas et al. |
| 2013/0046580 A1 | 2/2013 | Harker et al. |
| 2013/0059606 A1 | 3/2013 | Pujol |
| 2013/0061156 A1 | 3/2013 | Olsen et al. |
| 2013/0084921 A1* | 4/2013 | Koppal ............... H04M 1/0237 455/566 |
| 2013/0144868 A1 | 6/2013 | Ickman et al. |
| 2013/0225078 A1* | 8/2013 | Johansson ............ H04W 76/02 455/41.2 |
| 2013/0288603 A1* | 10/2013 | Iwasaki ................ H04W 4/008 455/41.2 |
| 2013/0297690 A1* | 11/2013 | Lucero .................. G06Q 50/01 709/204 |
| 2014/0022285 A1* | 1/2014 | Stovicek ............... G06F 1/1694 345/650 |
| 2014/0065960 A1* | 3/2014 | Gang ...................... H04B 5/00 455/41.1 |
| 2014/0344716 A1* | 11/2014 | Martin et al. ................. 715/753 |

OTHER PUBLICATIONS

Ahuja, Ravi, "Share Mobile Screen—App for iPhone, iPad and Android", Retrieved on: Mar. 13, 2013, Available at <<http://www.techhew.com/share-mobile-screen-app/>>, 4 pages.

Wenzel, et al., "Group Preferences in Social Network Services", In the Workshop Grundlagen von Datenbanken, May 28, 2010, 5 pages.

Wiese, et al., "Are You Close with Me? Are You Nearby? Investigating Social Groups, Closeness, and Willingness to Share", In 13th ACM International Conference on Ubiquitous Computing, Sep. 17, 2011, 10 pages.

PCT Second Written Opinion of the IPEA mailed May 11, 2015 for PCT application No. PCT/US2014/040974, 7 pages.

"International Preliminary Report on Patentability Issued in PCT Application No. PCT/US2014/040974", Mailed Date: Aug. 28, 2015, 8 Pages.

\* cited by examiner

FIG. 10

COLLABORATIVE MOBILE INTERACTION

BACKGROUND

Collaborative search is a type of social search in which participants work together to satisfy a shared information need. Collaborative search has many benefits, including enabling participants to achieve synergic effects like greater recall, offering the potential to improve search skills through exposure to others' behavior, and providing an opportunity to strengthen social connections.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for collaborative mobile interaction that includes transitioning between an individual mode and a collaborative mode in response to an orientation change of a device (e.g., a smartphone). For example, a user in a co-located group may physically signal a willingness to share information with other devices. In some implementations, a user may provide a physical signal to other co-located users that the user is entering a collaborative mode via an orientation change of the user's device. The other co-located users may enter the collaborative mode (e.g., to perform a collaborative search) by performing a similar orientation change.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Some examples include techniques and arrangements for transitioning between an individual mode and a collaborative mode in response to an orientation change of a device (e.g., for collaborative searching). Users with shared information needs may work together on search tasks. For example, when a group of users in physical proximity to one another search the Internet from their portable devices (e.g., smartphones), the users may perform the search task collaboratively.

The present disclosure relates to a collaborative mobile application that supports collaborative searching by allowing users to physically signal a willingness to share and facilitating face-to-face search-related communication. The collaborative mobile application may support individual mobile search functionality in an individual mode and collaborative mobile search functionality in a collaborative mode.

In some examples, a user may physically signal other users of a co-located group of users that the user is entering the collaborative mode by changing a device orientation. Thus, the orientation of a user device may serve as a physical indicator to others observing the user as to whether the user intends to search individually or to share search information. To illustrate, the physical signal may include re-orienting a device from a portrait orientation associated with the individual mode to a landscape orientation associated with the collaborative mode. Another user may respond to the physical signal by performing a similar orientation change to enter the collaborative mode in order to perform a collaborative search.

Example Implementations

Figure 1:
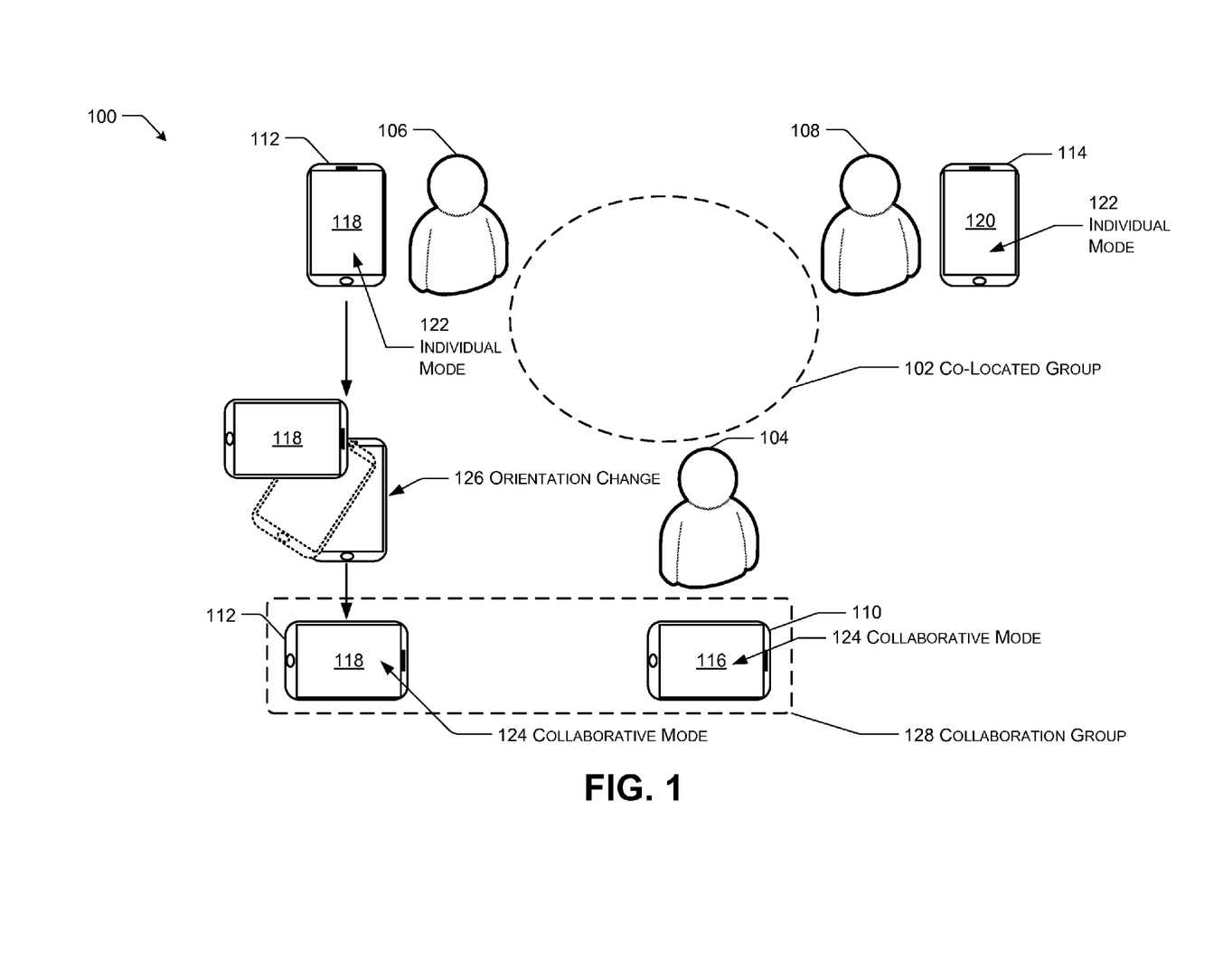
FIG. 1 illustrates an example of a framework for collaborative mobile interaction among co-located users according to some implementations.

FIG. 1 illustrates an example framework 100 for collaborative searching among co-located users according to some implementations. In FIG. 1, a co-located group 102 of users includes multiple users that are in close physical proximity to one another. The close proximity of the users may allow the users to physically signal a willingness to collaborate with one another via their respective devices (e.g., smartphones or other portable computing devices). For example, the physical signal may include adjusting an orientation of a device (e.g., from a portrait orientation to a landscape orientation). When another user performs a similar re-orientation of her device, information may be shared among the devices to allow for a collaborative search.

In the example illustrated in FIG. 1, the co-located group 102 includes a first user 104, a second user 106, and a third user 108. However, it will be appreciated that the co-located group 102 may include an alternative number of users, and a group of three co-located users is for illustrative purposes only. In FIG. 1, a first device 110 is associated with the first user 104, a second device 112 is associated with the second user 106, and a third device 114 is associated with the third user 108. The first device 110 includes a first display 116, the second device 112 includes a second display 118, and the third device 114 includes a third display 126.

While not illustrated in FIG. 1, each device includes a collaborative mobile application (see FIG. 10) that allows the device to operate in an individual mode 122 or a collaborative mode 124. In some examples, the collaborative mobile application may provide traditional mobile search support in the individual mode 122 and collaborative mobile search support in the collaborative mode 124. That is, the individual mode 122 may allow a user to perform an individual search, and the collaborative mode 124 may provide a shared experience that allows multiple users to perform a collaborative search. Further, while a collaborative mobile application is described in some examples herein, in other examples, the described functions may be performed by a module of an operating system or by any other suitable component, executable code, logic circuit, or combination thereof.

In the example of FIG. 1, each of the devices 110, 112, 114 is illustrated as a portable electronic device (e.g., a smartphone) having a rectangular shape. Thus, as viewed from the perspective of a user of the device, the term "portrait orientation" may refer to an orientation in which a vertical dimension of a display of the device is greater than a horizontal dimension of the display. Further, as viewed from the perspective of the user of the device, the term "landscape orientation" may refer to an orientation in which the horizontal dimension of the display is greater than the vertical dimension of the display. To illustrate, when operating in the individual mode 122 (e.g., in the portrait orientation), the vertical dimension of the second display 118 of the second device 112 is greater than the horizontal dimension of the second display 118. When operating in the collaborative mode 124 (e.g., in the landscape orientation), the horizontal dimension of the second display 118 is greater than the vertical dimension of the second display 118. Alternatively, in some examples, a device orientation may be determined based on a relative position of one or more components of the device. For example, in the case of a device having an alternative shape (e.g., a square device), a "first orientation" may refer to an orientation of a first device component (e.g., a speaker) with respect to another device component (e.g., a microphone).

The co-located group 102 may communicate via one or more local wireless sharing methods. In some examples, there may be multiple devices located in a particular location, and a connection step may be used to limit the devices that form the co-located group 102 for security, privacy, or other reasons. In some examples, a leader of the co-located group 102 (e.g., the first user 104) may create a name for the co-located group 102. In order to participate in the collaborative search, other users (e.g., the second user 106 or the third user 108) may enter their name and a session ID into a login screen. Users may also be prompted to select a color or other indicator to represent them in the collaborative mobile application. While a simple text string may be used to create a shared session, in other examples, the co-located group 102 may be established based on a stored list of common or frequent groups, camera information, proximity, or relative placement, among other alternatives.

In the example illustrated in FIG. 1, a device orientation may be used to determine whether the device is to operate in the individual mode 122 or the collaborative mode 124. In some implementations, an orientation change of the device may include a rotation of the device substantially within a plane defined by the device in a first orientation. For example, FIG. 1 illustrates that the device may operate in the individual mode 122 in a portrait orientation and may operate in the collaborative mode 124 in a landscape orientation. It will be appreciated that alternative methods may be used to determine whether to operate in the individual mode 122 or the collaborative mode 124. For example, a device may operate in the individual mode 122 when tilted in a particular direction with respect to the plane defined by the device in a first orientation (e.g., toward a user) and may operate in the collaborative mode 124 when tilted in another direction with respect to the plane defined by the device in the first orientation (e.g., away from the user).

In some implementations, a device may transition into different collaborative modes depending on the particular type of orientation change. For example, the device may be transitioned to a first collaborative mode in response to the device being rotated in a clockwise direction and may be transitioned to a second collaborative mode in response to the device being rotated in a counter-clockwise direction. As another example, the device may be transitioned to a first collaborative mode in response to the device being tilted in a first direction and may be transitioned to a second collaborative mode in response to the device being tilted in a second direction.

In some implementations, a device role within the co-located group 102 may differ depending on a type of orientation change. For example, a first device role may be assigned to a device in response to detecting a first type of orientation change, and a second device role may be assigned in response to detecting a second type of orientation change. For example, in FIG. 1, the first device 110 may be the first device of the co-located group 102 to transition into the collaborative mode 124. In this case, the first device 110 may operate as the master device in the co-located group 102. That is, the order in which the devices of the co-located group 102 transition into the collaborative mode 124 may be used to determine a device role, a device capability, or data shown on a display, among other alternatives. As the users are co-located, the first user 104 may send a visual cue to the other users 106, 108 that she is entering into the collaborative mode 124. In FIG. 1, the first user 104 has oriented the first device 110 in the landscape orientation to indicate that she is entering into the collaborative mode 124. The first device 110 is configured to make information available to the other devices of the co-located group 102 (i.e., the second device 112 and the third device 114). As illustrated in FIG. 1, the second device 112 and the third device 114 are initially in the portrait orientation and thus operating in the individual mode 122. That is, while the first user 104 may desire to make the information from the first device 110 available by re-orienting the first device 110, the information from the first device 110 may not be displayed on the second device 112 or the third device 114 that are operating in the individual mode 122.

In response to the visual cue of the first user 104 rotating the first device 110 into the landscape orientation, one or more other users of the co-located group 102 may desire to transition from the individual mode 122 to the collaborative mode 124. One or more other users of the co-located group 102 may desire to remain in the individual mode 122. For example, in FIG. 1, the third user 108 may desire to remain in the individual mode 122 and thus may not re-orient the second device 114 from the portrait orientation to the landscape orientation.

FIG. 1 illustrates that the second user 106 may perform an orientation change 126, re-orienting the second device 112 from the portrait orientation to the landscape orientation. In response to the orientation change 126, the second device 112 may transition to the collaborative mode 124, and a collaboration group 128 may be established that includes the first device 110 and the second device 112.

Figure 2:
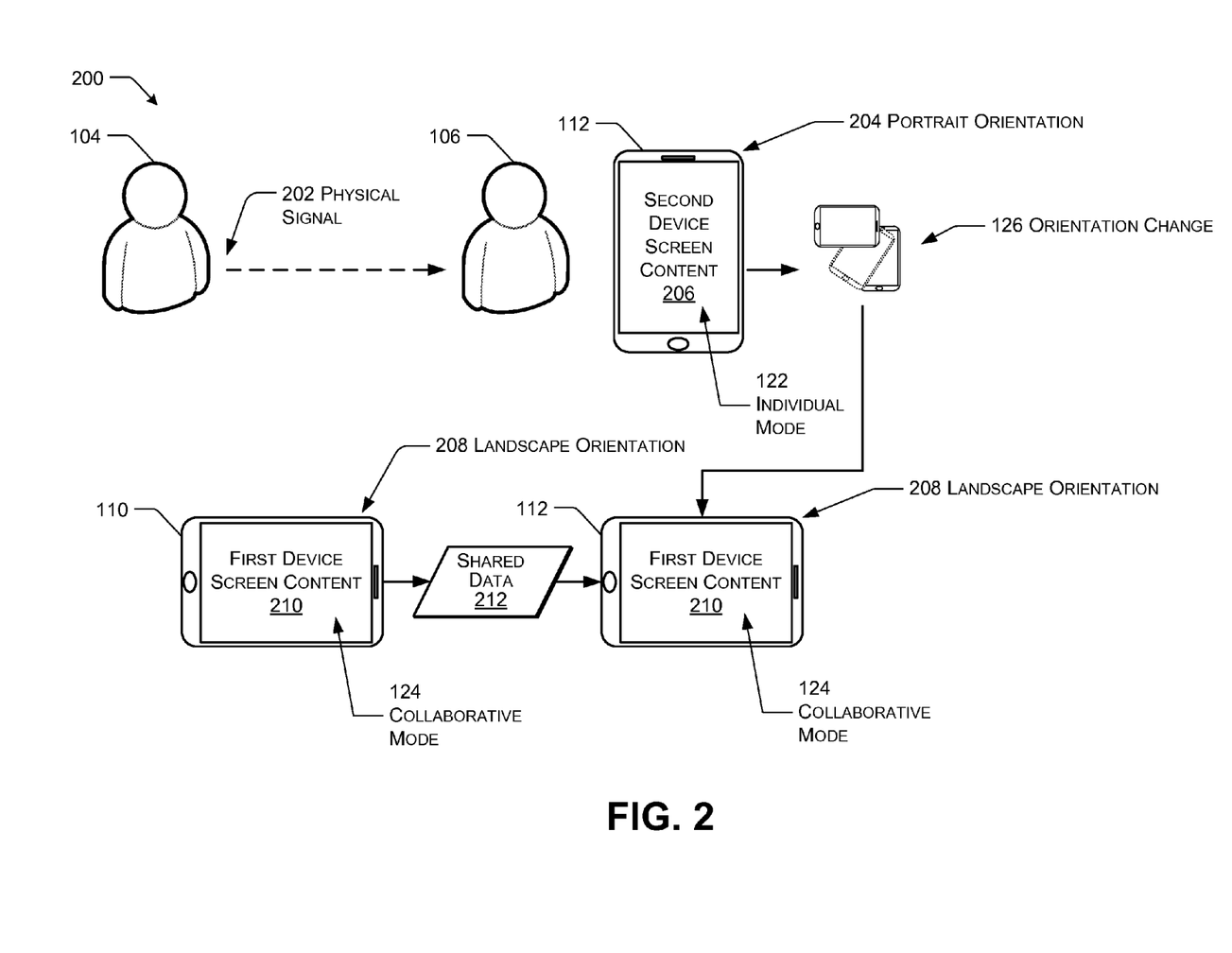
FIG. 2 illustrates an example of a process of a device transitioning from an individual mode to a collaborative mode in response to an orientation change according to some implementations.

FIG. 2 illustrates an example process 200 of transitioning a device from an individual mode to a collaborative mode via an orientation change. In the example of FIG. 2, at least a portion of the information that is displayed on the first device 110 may be displayed on the second device 112 upon the second device 112 entering into the collaborative mode 124 in response to the orientation change 126.

The first user 104 may provide a physical signal to the other users of the co-located group 102 that the first device 110 is entering into the collaborative mode 124, as shown at 202. As an example, the second user 106 may visually determine that the first user 104 has re-oriented the first device 110 from the portrait orientation to the landscape orientation. Alternatively, or additionally, the first user 104 may audibly indicate to the co-located group 102 that she has entered into the collaborative mode 124 by re-orientation into the landscape orientation and that the other users may also enter into the collaborative mode 124 by re-orienting their respective devices into the landscape orientation.

As illustrated in FIG. 2, the second device 112 is initially in a portrait orientation 204 and is operating in the individual mode 122. In the individual mode 122, the second device 112 is displaying second device screen content 206 that is associated with an individual search by the second user 106. The first device 110 is in a landscape orientation 208, is operating in the collaborative mode 124 and is displaying first device screen content 210.

In response to the orientation change 126 from the portrait orientation 204 to the landscape orientation 208, the second device 112 transitions into the collaborative mode 124. In the example of FIG. 2, shared data 212 from the first device 110 is communicated to the second device 112. As the first user 104 was the first to enter the collaborative mode 124, the shared data 212 may include the first device screen content 210 (e.g., search terms, result list, current view) that is displayed on the first device 110. In some examples, either the first user 104 or the second user 106 may subsequently control the collaborative search after the first device screen content 210 is displayed. That is, each user can interact with and change the state of the group perspective, with their interactions propagated. Alternatively, the first user 104 may maintain control of the search process, as the first user 104 was the first to enter the collaborative mode 124.

Figure 3:
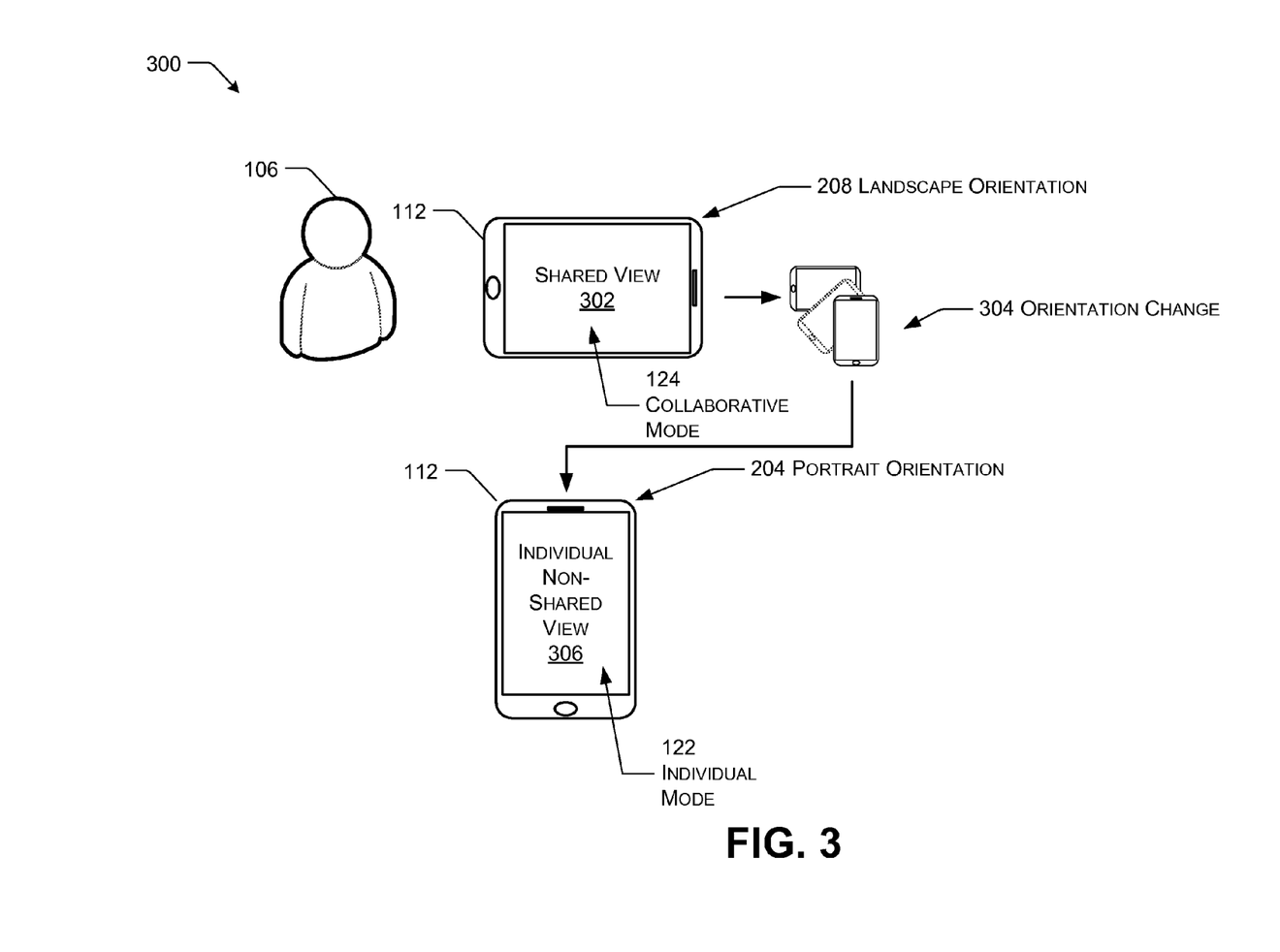
FIG. 3 illustrates an example of a process of a device transitioning from a collaborative mode to an individual mode in response to an orientation change according to some implementations.

FIG. 3 illustrates an example process 300 of transitioning a device from a collaborative mode to an individual mode via an orientation change. In the example of FIG. 3, the second device 112 is initially in the landscape orientation 208 and is operating in the collaborative mode 124. In the collaborative mode 124, the second device 112 is displaying a shared view 302 that is associated with a collaborative search between the second user 106 and at least one other user of the co-located group 102. For example, the collaborative search may involve the first user 104 and the second user 106, as illustrated in FIGS. 1 and 2.

In response to an orientation change 304 from the landscape orientation 208 to the portrait orientation 204, the second device 112 transitions from the collaborative mode 124 into the individual mode 122. In the individual mode 122, the second device 112 displays an individual, non-shared view 306 that is associated with an individual search by the second user 106. Thus, FIG. 3 illustrates that a device may transition from collaborative searching to individual searching in response to the orientation change 304.

Figure 4:
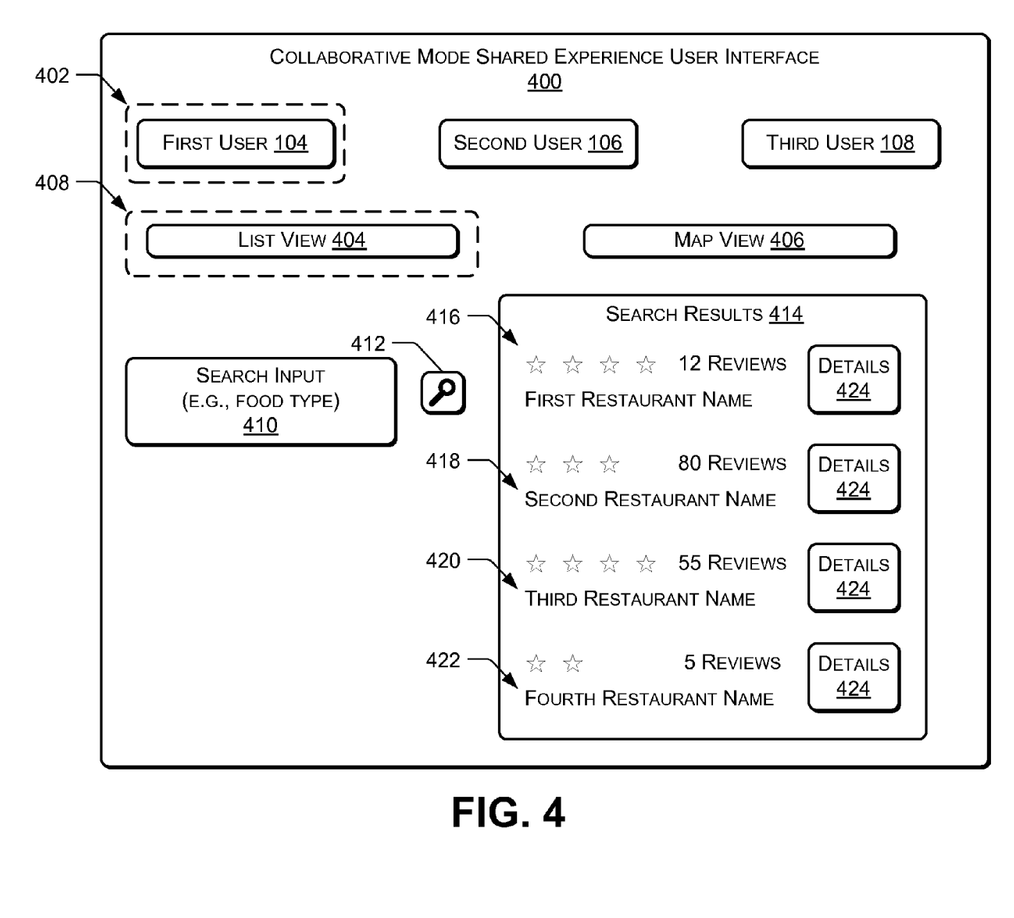
FIG. 4 illustrates an example of a collaborative mode shared experience user interface according to some implementations.

FIG. 4 illustrates an example collaborative mode shared experience user interface 400. In some examples, the collaborative mode shared experience user interface 400 may be displayed on each device that has entered the collaborative mode 124.

The collaborative mode shared experience user interface 400 may identify each user that has entered into the collaborative mode 124. For example, FIG. 4 illustrates that the first user 104, the second user 106, and the third user 108 have entered the collaborative mode 124. As an example, the first user 104 may be the user that first enters into the collaborative mode 124 (e.g., via an orientation change of the first device 110). As such, upon entering the collaborative mode 124, the collaborative mode shared experience user interface 400 may identify the first user 104 via one or more indicators (e.g., color), identified in FIG. 4 by dashed lines at 402. Further, the information that is initially presented may include search information associated with the first user 104.

The collaborative mode shared experience user interface 400 may include a list view 404 and a map view 406, among other possible views. As illustrated in FIG. 4, the particular view that is currently being displayed may be identified via one or more indicators (e.g., color). In this case, the list view 404 is currently being displayed, identified in FIG. 4 by dashed lines at 408.

The collaborative mode shared experience user interface 400 may include a search input 410 to receive search information from a user. A selectable search icon 412 may allow the user to execute a search based on the search information received via the search input 410. In response to execution of the search, search results 414 may be displayed. FIG. 4 illustrates an example of searching for local restaurants, with the search string "that" provided as the food type by the first user 104 via the search input 410. The search results 414 may include multiple restaurants, and multiple types of information associated with each restaurant may be displayed. To illustrate, in FIG. 4, the search results 414 include first restaurant information 416, second restaurant information 418, third restaurant information 420, and fourth restaurant information 422. In some examples, restaurant information associated with a particular restaurant may include a restaurant name, an average reviewer rating (e.g., number of stars or a numerical value) or a number of reviews, among other alternatives. As an illustrative example, in FIG. 4, the first restaurant information 416 includes the restaurant name ("First Restaurant Name"), an average reviewer rating of four stars, and an indication that the restaurant has received twelve reviews.

A details view (not shown) may be displayed in response to selection of a details icon 424. In some examples, the details view may present more detailed information about a specific search result (e.g., a specific restaurant in this case), such as a business address, a brief description, or a website, among other alternatives. As another example, the details view may present the review information received from the various reviewers for a particular restaurant. For example, the details view associated with the first restaurant information 416 may include a reviewer rating (e.g., a number of stars) and comments with regard to the first restaurant from each of the twelve reviewers.

For a collaborative search, there may be little conversation among users during the initial stages of the search process. As such, in some examples, the collaborative mobile application may provide additional information that may increase social interaction among the co-located users. For example, in the collaborative mode 124, the users may be prompted to engage in conversation related to the search task. In the illustrative case of searching for a restaurant, a pop-up or other user interface (not shown) may be presented that prompts the collaborating users to answer a trivia question (e.g., "What was the first retailer to offer freshly-brewed coffee in to-go cups?"). In some examples, trivia questions may be shown at random intervals during the course of a search, timed so as to minimize disruption (e.g., not during text entry). Further, in some examples, the pop-up with the question may appear simultaneously across all devices, and in some examples participants may continue their search by dismissing the pop-up. Interrupting each of the users engaged in the collaborative search with the same trivia question at the same time may promote social interaction by prompting the users to engage in conversation.

Figure 5:
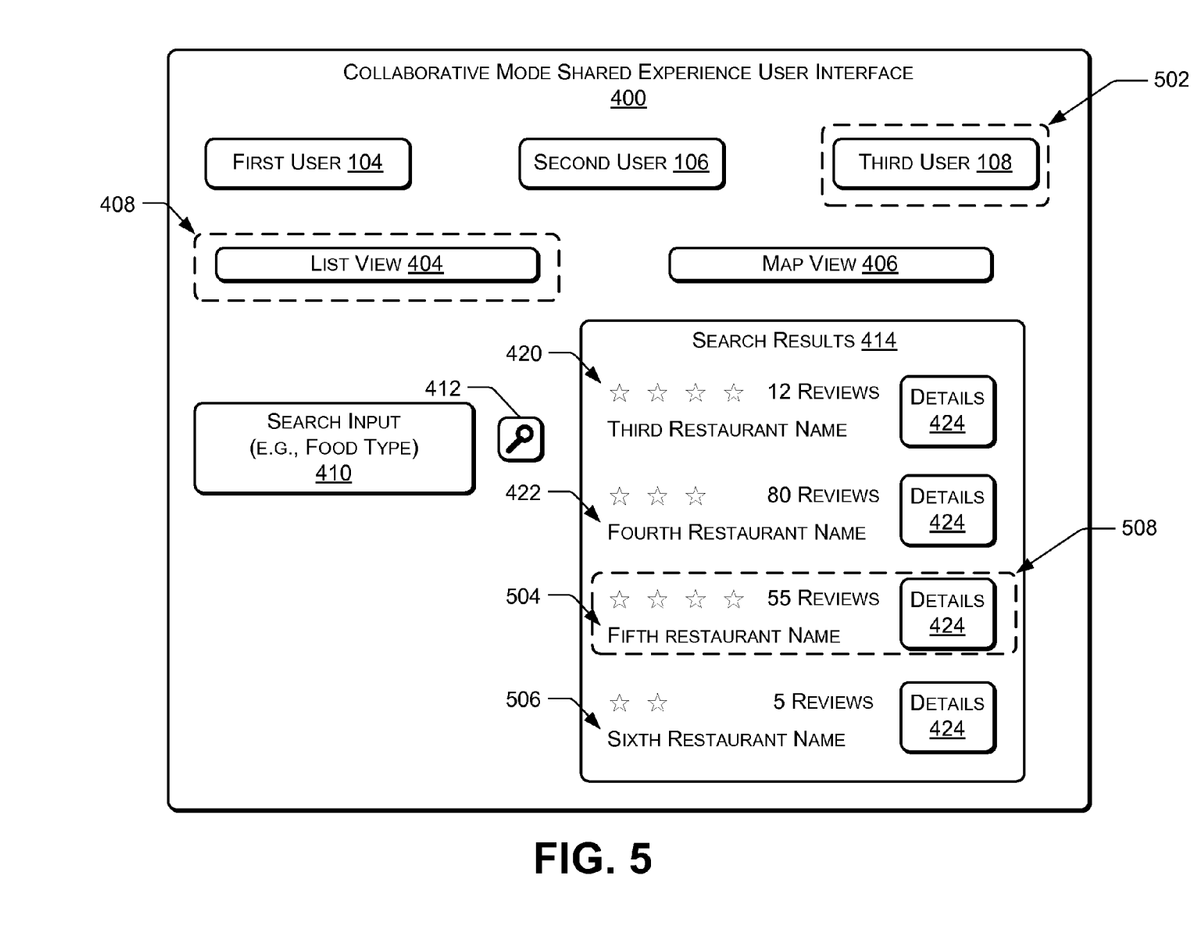
FIG. 5 illustrates an example of a collaborative mode shared experience user interface according to some implementations.

FIG. 5 illustrates an example collaborative mode shared experience user interface 400. FIG. 5 illustrates virtual "pointing" across devices, where items that a particular user is touching or otherwise identifying are highlighted (e.g., in a particular color associated with that user) on the devices of the other users in a co-located group.

In the example of FIG. 5, the list view 404 is currently being displayed, identified by dashed lines at 408. Further, the collaborative mode shared experience user interface 400 identifies that the third user 108 is currently active, identified in FIG. 5 by dashed lines at 502. In FIG. 5, the search results 414 include the third restaurant information 420 and the fourth restaurant information 422. During the collaborative search process, the search results 414 may change depending on the interaction of each of the users via the collaborative mode shared experience user interface 400. For example, in FIG. 5, the search results 414 include fifth restaurant information 504 and sixth restaurant information 506. In this case, the fifth restaurant information 504 is currently being touched or otherwise selected by the third user 108, identified in FIG. 5 by dashed lines at 508. Such information may be presented to the first user 104 and to the second user 106, providing "virtual pointing" capability via the collaborative mode shared experience user interface 400.

Thus, FIG. 5 illustrates that the collaborative mode shared experience user interface 400 may allow a co-located group of users to "virtually point" to a particular item, rather than physically showing another user her device and physically pointing to the particular item on her device.

Figure 6:
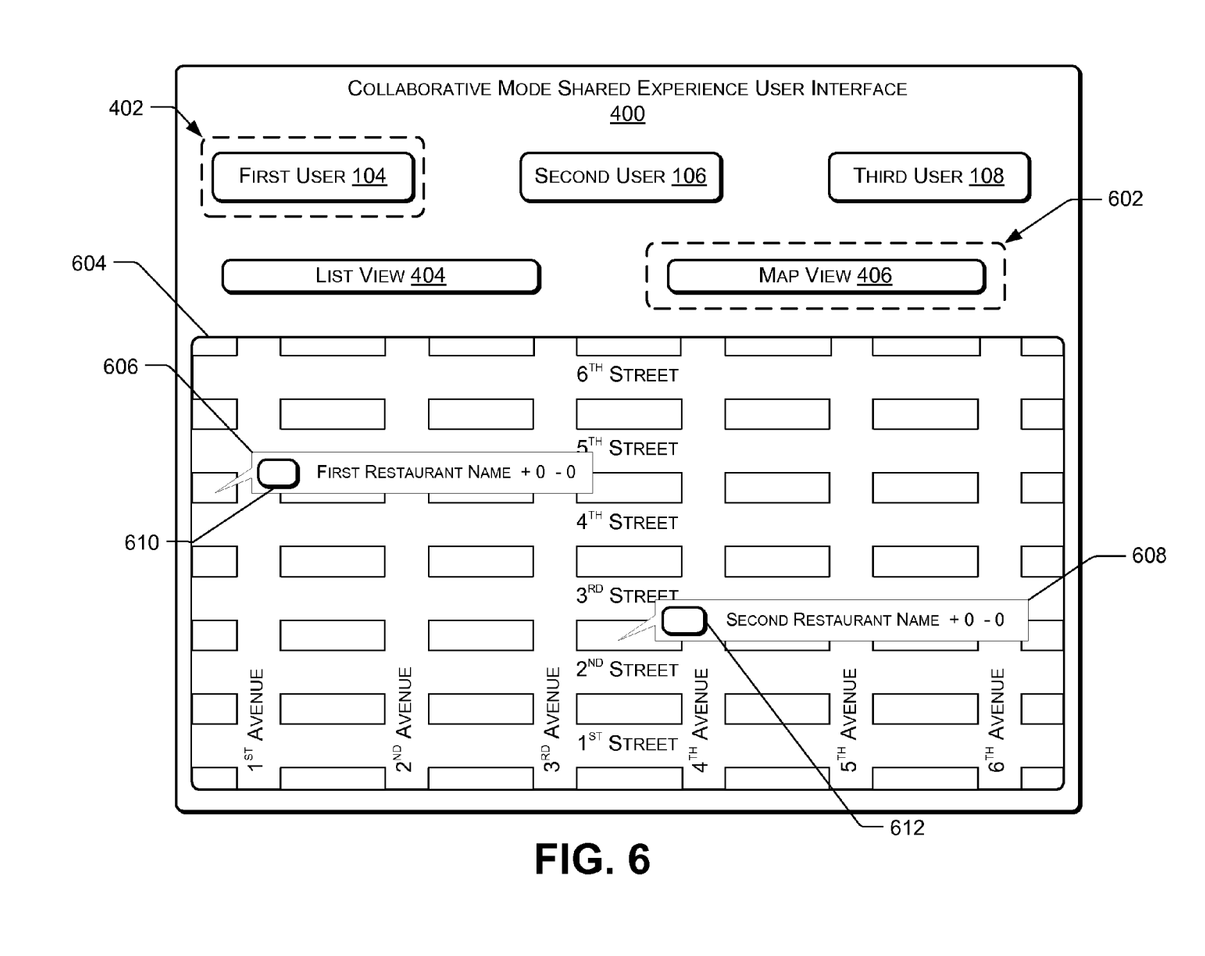
FIG. 6 illustrates an example of a collaborative mode shared experience user interface according to some implementations.

FIG. 6 illustrates an example collaborative mode shared experience user interface 400. FIG. 6 illustrates that one or more search results may alternatively be presented in a map view.

As illustrated in FIG. 6, the particular view that is currently being displayed may be identified via one or more indicators (e.g., color). In this case, the map view 406 is currently being displayed, identified in FIG. 6 by dashed lines at 602.

The map view 406 may include a map 604 of a particular geographical area associated with one or more of the search results 414 presented in response to the first user 104 executing a search, as illustrated in FIG. 4. In FIG. 6, a first map identifier 606 identifies a location of the first restaurant on the map 604 and includes at least a portion of the first restaurant information 416 included in the search results 414. A second map identifier 608 identifies a location of the second restaurant on the map 604 and includes at least a portion of the second restaurant information 418 included in the search results 414.

The first map identifier 606 may also include a number of positive reviews associated with the first restaurant received from one or more users of the co-located group. For example, the first map identifier 606 indicates that the first restaurant has received zero positive votes (identified in FIG. 6 as a number following a "+" sign) and has received zero negative votes (identified in FIG. 6 as a number following a "−" sign). The second map identifier 606 indicates that the second restaurant has received zero positive votes and has received zero negative votes. FIG. 6 further illustrates that a first voting icon 610 may be included in the first map identifier 606, and a second voting icon 612 may be included in the second map identifier 608. Instead of potentially interrupting others during the individual search phase to verbally offer an opinion regarding a particular restaurant, users can select a voting icon to rate the restaurant.

Figure 7:
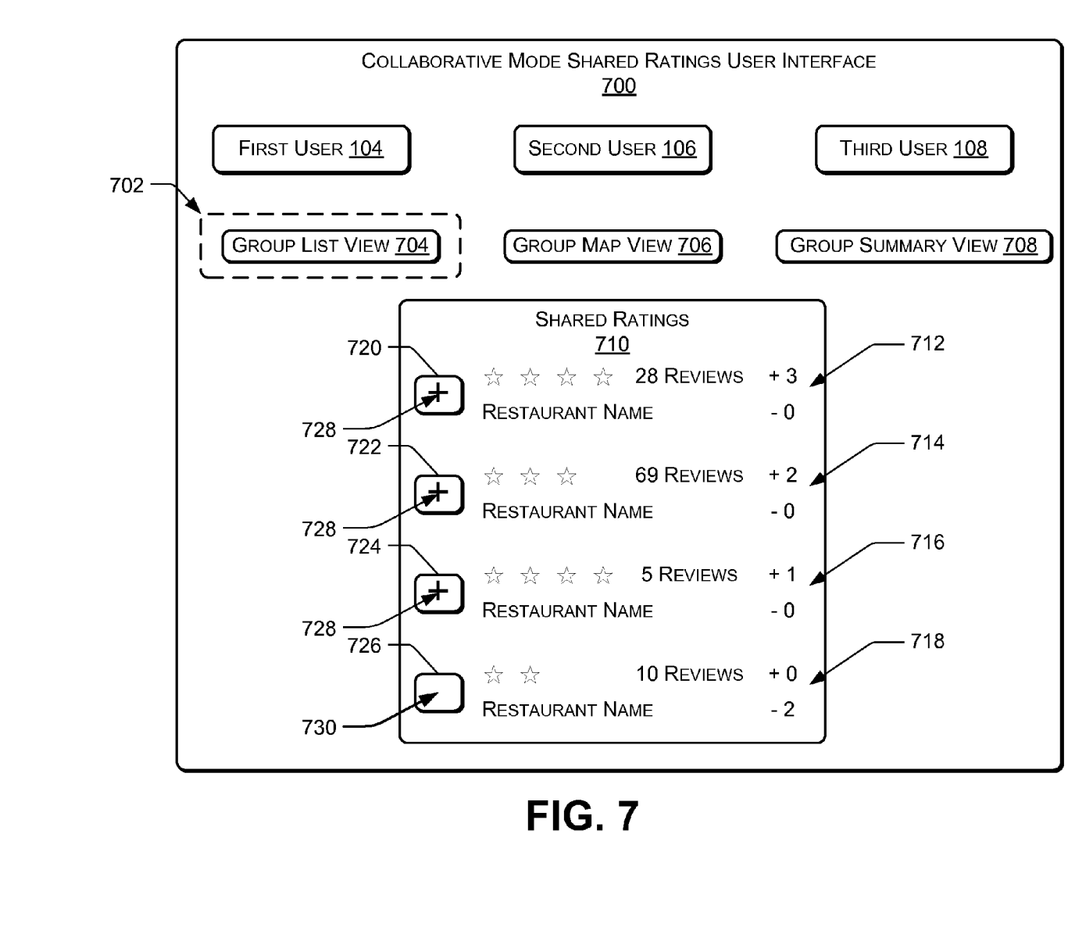
FIG. 7 illustrates an example of a collaborative mode shared ratings user interface according to some implementations.

FIG. 7 illustrates an example of a collaborative mode shared ratings user interface 700. In some examples, the collaborative mode shared ratings user interface 700 may be displayed on each device that has entered the collaborative mode 124.

The collaborative mode shared ratings user interface 700 may identify each user that has entered into the collaborative mode 124. For example, FIG. 7 illustrates that the first user 104, the second user 106, and the third user 108 have entered the collaborative mode 124.

The collaborative mode shared ratings user interface 700 may include a group list view 704, a group map view 706 and a group summary view 708, among other possible views. As illustrated in FIG. 7, the particular view that is currently being displayed may be identified via one or more indicators (e.g., color). In this case, the group list view 704 is currently being displayed, identified in FIG. 7 by dashed lines at 702.

In some examples, after an orientation change (e.g., from a portrait orientation to a landscape orientation), a user may see the group list view 704 or the group map view 706 with at least some of the items (e.g., restaurant candidates) that were rated by at least one group member. This may allow users of a co-located group to focus their discussion on the potential restaurant candidates that were rated throughout the search experience.

In the example illustrated in FIG. 7, the group list view 704 includes shared ratings 710, representing aggregate ratings from each of the users of the co-located group. In FIG. 7, the shared ratings 710 include four search results, with an aggregate rating associated with each of the search results. For example, a first aggregate rating 712 (e.g., +3−0) may be associated with a first search result, a second aggregate rating 714 (e.g., +2−0) may be associated with a second search result, a third aggregate rating 716 (e.g., +1−0) may be associated with a third search result, and a fourth aggregate rating 718 (e.g., +0−2) may be associated with a fourth search result.

Further, for each search result in the shared ratings 710, a voting icon may be included to allow a user to vote on a particular search result. To illustrate, a first voting icon 720 may be associated with the first search result, a second voting icon 722 may be associated with the second search result, a third voting icon 724 may be associated with the third search result, and a fourth voting icon 726 may be associated with the fourth search result. In FIG. 7, the user has provided a positive rating 728 for the first search result via the first voting icon 720, a positive rating 728 for the second search result via the second voting icon 722, and a positive rating 728 for the third search result via the third voting icon 724. The fourth voting icon 726 indicates that a neutral rating 730 is associated with the fourth search result.

In some examples, the voting icons 720, 722, 724 and 726 may include "three-way" voting icons that may allow a user to toggle between a positive vote (e.g., identified as a "+"), a negative vote (e.g., identified as a "−") and a neutral vote (e.g., a blank field). In some examples, a single selection (e.g., a single touch or a single "click") may indicate a positive ("+") rating, two selections may indicate a negative ("−") rating, and three selections may restore the rating to the neutral state.

In some examples, at least some voting may be implicitly determined based at least in part on previous searches by a particular user. For example, instead of a user explaining preferences to other group members, profile-based "graying out" of results may be used. As an illustrative example, when joining the group, a user may indicate positive and negative preferences (e.g., the user is a vegetarian, a vegan, etc.), and these preferences may be provided to other users (e.g., by graying out results not compatible with that user's profile).

Figure 8:
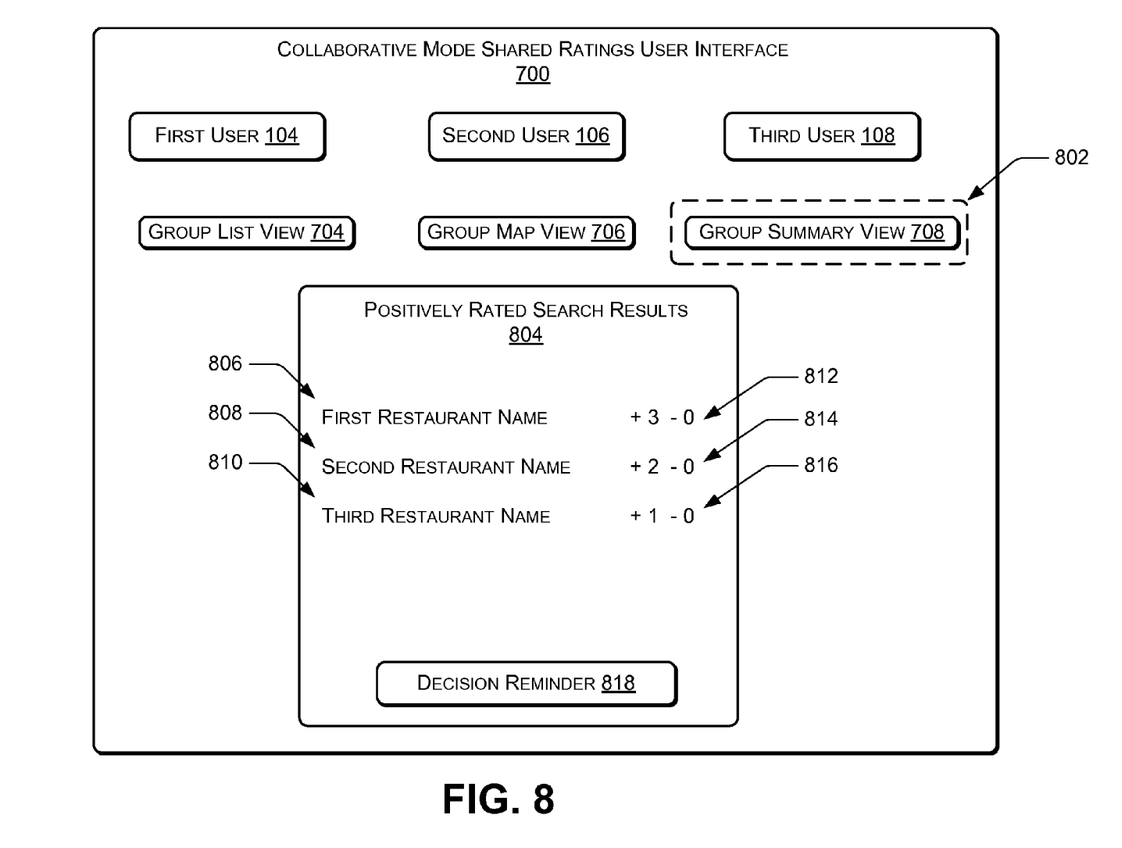
FIG. 8 illustrates an example of a collaborative mode shared ratings user interface according to some implementations.

FIG. 8 illustrates an example of a collaborative mode shared ratings user interface 700. In some examples, the collaborative mode shared ratings user interface 700 may be displayed on each device that has entered the collaborative mode 124.

As illustrated in FIG. 8, the particular view that is currently being displayed may be identified via one or more indicators (e.g., color). In this case, the group summary view 708 is currently being displayed, identified in FIG. 8 by dashed lines at 802.

In the example illustrated in FIG. 8, the group summary view 708 includes positively rated search results 804, including at least some of the items (e.g., restaurant candidates) that were rated positively by at least one group member. This may allow users of a co-located group to focus their discussion on the potential restaurant candidates that were positively rated.

In FIG. 8, the positively rated search results 804 include three search results. The three search results include a first restaurant name 806, a second restaurant name 808, and a third restaurant name 810. An aggregate rating is associated with each of the search results. For example, a first aggregate rating 812 (e.g., +3−0) may be associated with the first restaurant name 806, a second aggregate rating 814 (e.g., +3−0) may be associated with the second restaurant name 808, and a third aggregate rating 816 (e.g., +2−0) may be associated with the third restaurant name 810.

FIG. 8 also includes a decision reminder 818. In some cases, a user may be uncomfortable requesting that other users stop searching and make a decision (e.g., select a restaurant). The decision reminder 818 may be selected by a user to signal to other users that it is time to make a decision. For example, the decision reminder 818 may include an "I'm hungry!" button that the user can select to indicate to the other users of the co-located group that it is time to select a restaurant. In response to selection of the decision reminder 818, the most popular search result (e.g., the first restaurant name 806 in this case, with three positive votes) may be automatically selected and presented (e.g., via a pop-up or other user interface) to all users of the co-located group for approval. Thus, the decision reminder 818 may allow a user to gently remind other users to reach consensus.

Figure 9:
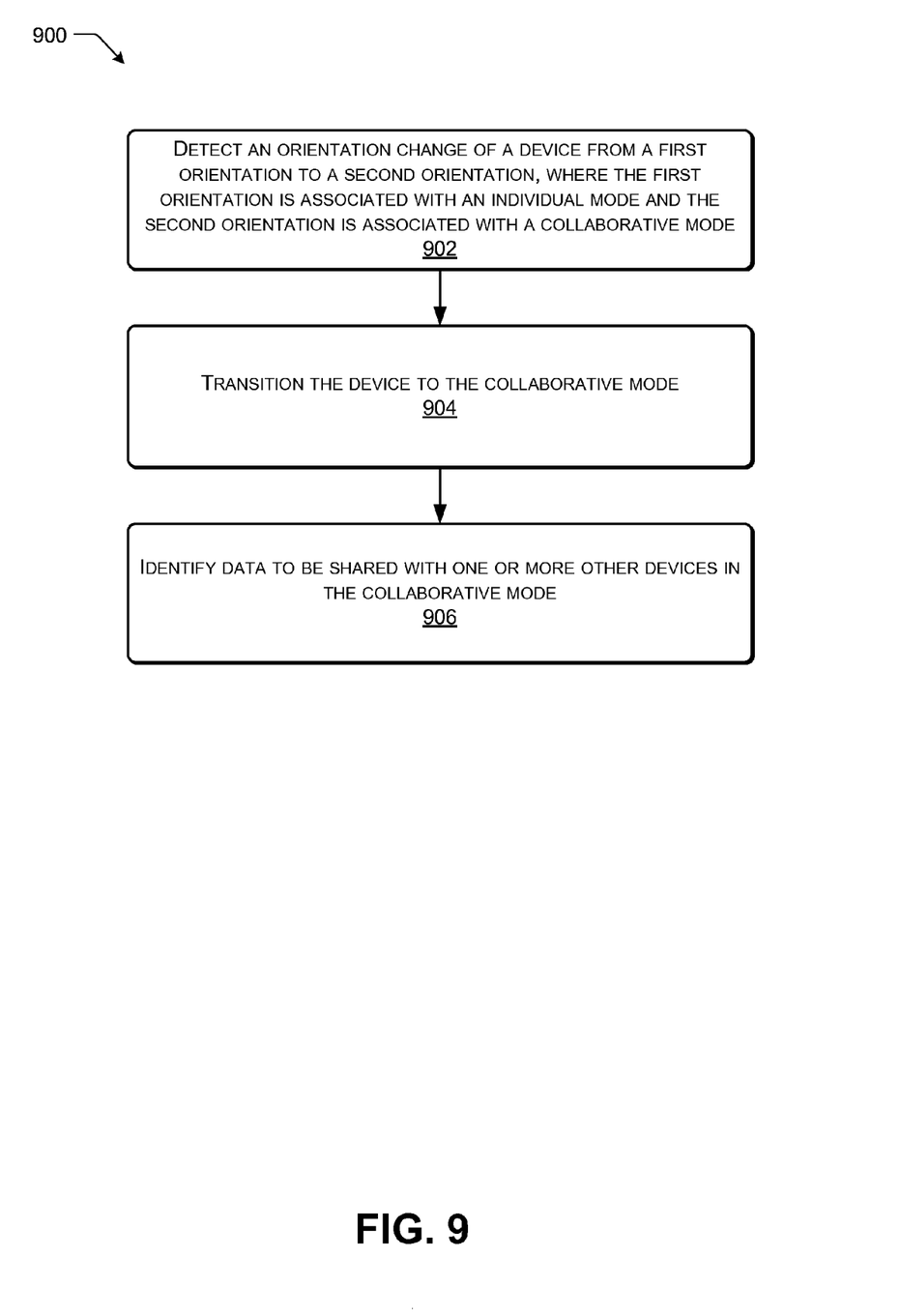
FIG. 9 illustrates an example process flow for transitioning to a collaborative mode according to some implementations.

Referring to FIG. 9, an example of a method of collaborative searching is illustrated and generally designated 900.

At block 902, the method 900 may include detecting an orientation change of a device from a first orientation to a second orientation. The first orientation may be associated with an individual mode and the second orientation is associated with a collaborative mode. For example, the device may include the first device 110 of FIG. 1, and the orientation change may include a change from a portrait orientation associated with the individual mode 122 to a landscape orientation associated with the collaborative mode 124.

In response to detecting the orientation change of the device at block 902, the method 900 may include transitioning the device to the collaborative mode, at block 904, and identifying data to be shared with one or more other devices in the collaborative mode, at block 906. For example, the first device 110 of FIG. 1 may transition from the individual mode 122 to the collaborative mode 124.

Referring to FIG. 2, in one example, the data to be shared may include the first device screen content 210. That is, the first device 110 may perform a screen share operation with the second device 112 when the second device 112 has transitioned to the collaborative mode 124 after the orientation change 126 from the portrait orientation 204 to the landscape orientation 208.

As another example, referring to FIG. 4, the data to be shared may include the search results 414 from the first user 402 obtained in the individual mode 122, to be displayed in the collaborative mode shared experience user interface 400 via the list view 404. As a further example, referring to FIG. 6, the data to be shared may include at least a portion of the search results 414 from the first user 402 obtained in the individual mode 122, to be displayed in the collaborative mode shared experience user interface 400 via the map view 404.

As a further example, referring to FIG. 7, the data to be shared may include ratings received from the first user 402 to be combined into the shared ratings 710 and displayed in the collaborative mode shared ratings user interface 700 via the group list view 704. As a further example, referring to FIG. 8, the data to be shared may include positive ratings received from the first user 402 to be combined into the positively rated search results 804 and displayed in the collaborative mode shared ratings user interface 700 via the group summary view 708.

Example Computing Device and Environment

Figure 10:
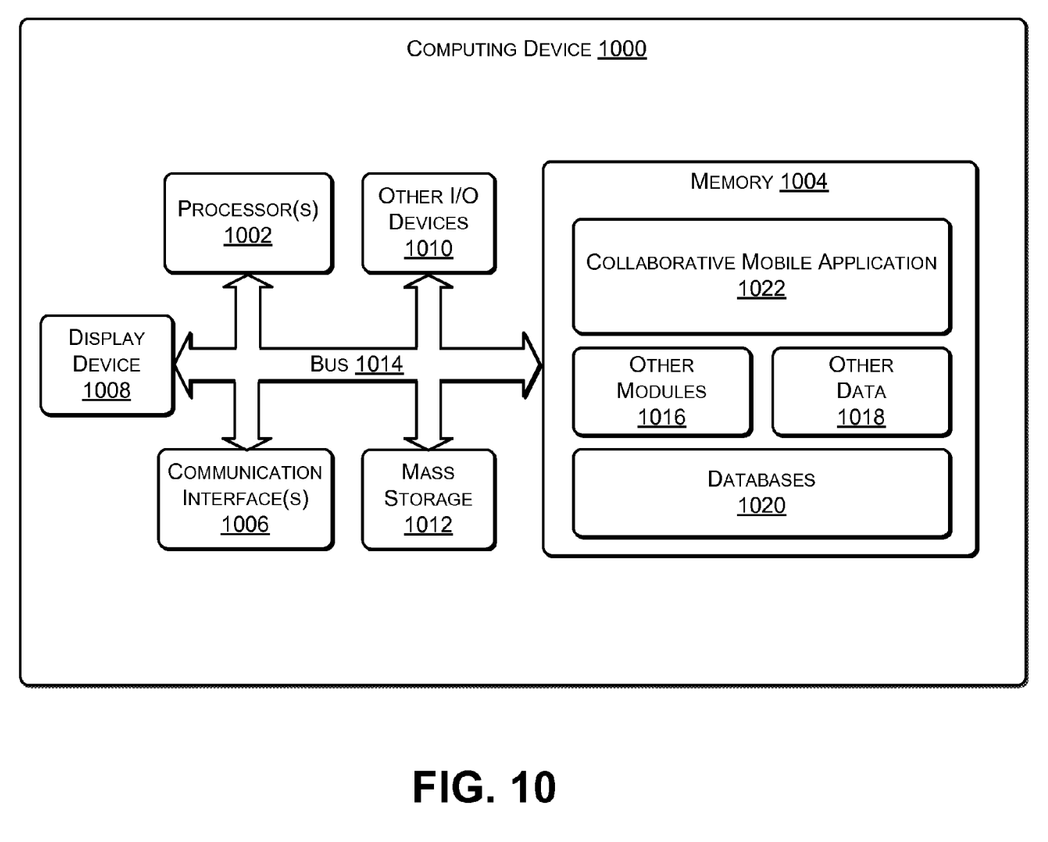
FIG. 10 illustrates an example computing device and system environment in which some implementations may operate.

FIG. 10 illustrates an example configuration of a computing device 1000 and an environment that can be used to implement the modules and functions described herein.

The computing device 1000 may include at least one processor 1002, a memory 1004, communication interfaces 1006, a display device 1008 (e.g. a touchscreen display), other input/output (I/O) devices 1010 (e.g. a touchscreen display or a mouse and keyboard), and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile tangible memory devices (e.g., RAM, ROM).

Further, mass storage devices 1012 may generally include hard disk drives, solid-state drives, removable media, including external and removable drives, memory cards, flash memory, floppy disks, optical disks (e.g., CD, DVD), a storage array, a network attached storage, or a storage area network. Both memory 1004 and mass storage devices 1012 may be collectively referred to as memory or computer storage media herein, and may be computer-readable media capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

The discussion herein refers to data being sent and received by particular components or modules. This should not be taken as a limitation as such communication need not be direct and the particular components or modules need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 1008, such as touchscreen display or other display device, may be included in some implementations. Other I/O devices 1010 may be devices that receive various inputs from a user and provide various outputs to the user, and may include a touchscreen, such as a touchscreen display, a keyboard, a remote controller, a mouse, a printer, audio input/output devices, and so forth.

Memory 1004 may include modules and components for execution by the computing device 1000 according to the implementations discussed herein. In the illustrated example, memory 1004 includes a collaborative mobile application 1022 to implement the collaborative functionality described above. Memory 1004 may further include one or more other modules 1016, such as an operating system, drivers, application software, communication software, or the like. Memory 1004 may also include other data 1018, such as data stored while performing the functions described above and data used by the other modules 1016. Memory 1004 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
    under control of one or more processors:
    detecting an orientation change of a first device from a first orientation to a second orientation, the first orientation and the second orientation based on a user viewing perspective of a display of the first device, wherein the first orientation activates an individual mode and the second orientation activates a collaborative mode;
    transitioning the first device to the collaborative mode based at least in part on detecting the orientation change of the first device;
    enabling, based at least in part on the transitioning and independent of user input, sharing functionality associated with the first device; and
    identifying data to be shared with at least one other device that is also in the collaborative mode and a same orientation as the first device, wherein the data to be shared with the at least one other device in the collaborative mode includes at least a portion of content displayed on the display of the first device.

2. The method of claim 1, wherein detecting the orientation change of the first device includes detecting a rotation of the first device substantially within a plane defined by the first device in the first orientation.

3. The method of claim 2, wherein:
    the first orientation includes a portrait orientation; and
    the second orientation includes a landscape orientation.

4. The method of claim 2, wherein:
    the first device is transitioned to a first collaborative mode in response to the first device being rotated in a clockwise direction with respect to the first orientation of the first device; and
    the first device is transitioned to a second collaborative mode that is different from the first collaborative mode in response to the first device being rotated in a counter-clockwise direction with respect to the first orientation of the first device.

5. The method of claim 1, wherein:
    detecting the orientation change of the first device includes detecting a tilting of the first device with respect to a plane defined by the first device in the first orientation;
    the first device is transitioned to a first collaborative mode in response to the first device being tilted in a first direction with respect to the plane defined by the first device in the first orientation; and
    the first device is transitioned to a second collaborative mode that is different from the first collaborative mode in response to the first device being tilted in a second direction with respect to the plane defined by the first device in the first orientation.

6. The method of claim 1, wherein:
    the first device is transitioned to a first collaborative mode in response to the first device being rotated substantially within a plane defined by the first device in the first orientation; and
    the first device is transitioned to a second collaborative mode that is different from the first collaborative mode in response to the first device being tilted with respect to the plane defined by the first device in the first orientation.

7. The method of claim 1, wherein the data to be shared with the at least one other device in the collaborative mode includes at least a user selection at the first device to be displayed on the at least one other device.

8. The method of claim 1, further comprising initiating a screen share operation with the at least one other device.

9. The method of claim 1, wherein the data to be shared with the at least one other device in the collaborative mode includes at least a portion of search information obtained in the individual mode.

10. The method of claim 1, further comprising receiving collaborative data from the at least one other device.

11. The method of claim 1, wherein:
    the first device and the at least one other device form a co-located group of devices;
    a first device role is assigned to the first device in response to detecting a first type of orientation change; and
    a second device role that is different from the first device role is assigned to the first device in response to detecting a second type of orientation change.

12. The method of claim 1, further comprising sharing the identified data with the at least one other device in response to determining that the at least one other device has transitioned to the collaborative mode.

13. The method of claim 12, wherein the at least one other device operates in the collaborative mode when oriented in the second orientation.

14. The method of claim 1, wherein:
    the individual mode is associated with an individual search; and
    the collaborative mode is associated with a collaborative search.

15. A device comprising:
    a display;
    one or more processors;
    one or more computer-readable media maintaining instructions that, when executed by the one or more processors, cause the one or more processors to perform acts comprising:
        displaying information on the display in a first orientation associated with an individual search mode, the first orientation defining a user viewing perspective of the display;
        detecting an orientation change of the device to a second orientation associated with a collaborative search mode, the second orientation defining another user viewing perspective of the display;
        transitioning the first device to the collaborative search mode based at least in part on detecting the orientation change of the first device;
        enabling, based at least in part on the transitioning and independent of user input, sharing functionality associated with the first device; and
        identifying data to be shared with at least one other device that is also in the collaborative search mode and a same orientation as the device, wherein the data to be shared with the at least one other device in the collaborative mode includes at least a portion of content displayed on the display of the device.

16. The device of claim 15, the acts further comprising identifying a plurality of devices of a co-located group, each device associated with a different user.

17. The device of claim 16, the acts further comprising:
    sharing data with one or more devices of the plurality of devices of the co-located group that are in the collaborative search mode; and
    not sharing data with one or more devices of the plurality of devices of the co-located group that are in the individual search mode.

18. One or more computer storage media maintaining instructions that, when executed by one or more processors, cause the one or more processors to perform acts comprising:
- displaying content on a display of a device in a portrait orientation associated with an individual search mode;
- detecting an orientation change of the device from the portrait orientation to a landscape orientation associated with a collaborative search mode;
- transitioning the device to the search collaborative mode based at least in part on detecting the orientation change of the device;
- enabling, based at least in part on the transitioning and independent of user input, sharing functionality associated with the device;
- identifying, as identified content, at least a portion of the content displayed on the display of the device to be shared;
- determining one or more devices of a co-located group of devices that are in the collaborative search mode and in the landscape orientation;
- sharing the identified content with the one or more devices of the co-located group of devices that are in the collaborative search mode;
- receiving collaborative data from the one or more other devices of the co-located group of devices that are in the collaborative search mode; and
- initiating display of a collaborative search mode user interface on the display of the device that includes at least a portion of the received collaborative data.

19. The one or more computer storage media of claim 18, wherein the collaborative search mode user interface identifies a user associated with the collaborative data received from a particular device of the one or more devices of the co-located group of devices that are in the collaborative search mode.

20. The one or more computer storage media of claim 18, the acts further comprising:
- in response to a second orientation change of the device from the landscape orientation to the portrait orientation, transitioning the device to the individual search mode; and
- initiating display of an individual search mode user interface on the device.

* * * * *